US009693317B2

United States Patent
Xu

(10) Patent No.: US 9,693,317 B2
(45) Date of Patent: Jun. 27, 2017

(54) CONFIGURATION METHOD FOR TRANSMITTING TPC COMMAND, TPC COMMAND TRANSMISSION METHOD, AND APPARATUS

(71) Applicant: HUAWEI TECHNOLOGIES CO., LTD., Shenzhen (CN)

(72) Inventor: Wenying Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/266,378

(22) Filed: Sep. 15, 2016

(65) Prior Publication Data
US 2017/0006552 A1    Jan. 5, 2017

Related U.S. Application Data

(63) Continuation of application No. PCT/CN2014/073530, filed on Mar. 17, 2014.

(51) Int. Cl.
| | |
|---|---|
| H04B 7/00 | (2006.01) |
| H04W 52/14 | (2009.01) |
| H04W 52/58 | (2009.01) |
| H04W 72/04 | (2009.01) |
| H04W 52/38 | (2009.01) |
| H04W 52/40 | (2009.01) |

(52) U.S. Cl.
CPC ......... *H04W 52/146* (2013.01); *H04W 52/58* (2013.01); *H04W 72/0446* (2013.01); *H04W 52/386* (2013.01); *H04W 52/40* (2013.01)

(58) Field of Classification Search
CPC ..... H04W 52/04; H04W 52/06; H04W 52/18; H04W 52/545; H04W 52/386; H04W 52/146; H04W 52/58; H04W 52/40; H04W 72/0446
USPC .................................. 455/522, 67.11, 68–70
See application file for complete search history.

(56) References Cited

U.S. PATENT DOCUMENTS

| | | | |
|---|---|---|---|
| 9,357,511 B2* | 5/2016 | Chapman | H04B 7/0602 |
| 2003/0100269 A1* | 5/2003 | Lehtinen | H04B 7/264 455/69 |
| 2004/0002353 A1* | 1/2004 | Frantti | H04W 52/58 455/522 |

(Continued)

OTHER PUBLICATIONS

International Search Report dated Dec. 24, 2014 in corresponding International Application No. PCT/CN2014/073530.

(Continued)

*Primary Examiner* — Dominic Rego
(74) *Attorney, Agent, or Firm* — Staas & Halsey LLP

(57) ABSTRACT

A configuration method for transmitting TPC command, a TPC command transmission method, and an apparatus. In the present invention, a radio network controller sends indication information to a terminal and a serving base station of the terminal to indicate a sending timeslot of an uplink TPC command of the terminal, so that sending timeslots of different TPC commands can be indicated for different terminals, and uplink TPC commands of multiple terminals are staggered in a timeslot. In this way, even if F-DPCHs of multiple terminals are configured with a same timeslot format, it can be avoided that locations of the uplink TPC commands are the same, and further a TPC peak-to-average ratio is lower than that in the prior art.

16 Claims, 4 Drawing Sheets

(56) References Cited

U.S. PATENT DOCUMENTS

| | | | | |
|---|---|---|---|---|
| 2004/0047329 A1* | 3/2004 | Zheng | .................... | H04J 13/10 |
| | | | | 370/342 |
| 2006/0040669 A1* | 2/2006 | Innami | ................. | H04W 52/40 |
| | | | | 455/442 |
| 2006/0246937 A1* | 11/2006 | Lindoff | .............. | H04W 52/146 |
| | | | | 455/522 |
| 2007/0060183 A1* | 3/2007 | Moulsley | ........... | H04W 52/325 |
| | | | | 455/522 |
| 2007/0217348 A1* | 9/2007 | Tapia Moreno | .... | H04W 52/243 |
| | | | | 370/278 |
| 2010/0157956 A1* | 6/2010 | Takahashi | ............ | H04W 52/54 |
| | | | | 370/336 |
| 2010/0303043 A1 | 12/2010 | Hosono | | |
| 2011/0105061 A1* | 5/2011 | Yu | ....................... | H03G 3/3042 |
| | | | | 455/127.2 |
| 2012/0113825 A1* | 5/2012 | Baglin | ................. | H04W 24/00 |
| | | | | 370/252 |
| 2015/0071081 A1* | 3/2015 | Gupta | ................ | H04W 52/146 |
| | | | | 370/241 |

OTHER PUBLICATIONS

Extended European Search Report dated Jan. 25, 2017 in corresponding European Patent Application No. 14886455.6.

* cited by examiner

CONFIGURATION METHOD FOR TRANSMITTING TPC COMMAND, TPC COMMAND TRANSMISSION METHOD, AND APPARATUS

CROSS-REFERENCE TO RELATED APPLICATIONS

This application is a continuation of International Patent Application No. PCT/CN2014/073530 filed on Mar. 17, 2014, the disclosure of which is hereby incorporated by reference in its entirety.

TECHNICAL FIELD

The present invention relates to the field of wireless communications, and in particular, to a configuration method for transmitting TPC command, a TPC command transmission method, and an apparatus.

BACKGROUND

A UMTS (Universal Mobile Telecommunications System) is one of global 3G standards formulated by the international standardization organization 3GPP (3rd Generation Partnership Project). As one of mainstream technologies of a 3rd generation mobile communications system, WCDMA (Wideband Code Division Multiple Access) is applied to an earlier version of the UMTS. In a later version of the UMTS, an HSDPA (High Speed Downlink Packet Access) technology is introduced to improve a downlink data transmission rate, and an HSUPA (High Speed Uplink Packet Access) technology is introduced to improve an uplink data transmission rate, so as to reduce a data transmission delay and enable a user to have better experience in a UMTS network.

To overcome impact of channel attenuation and ensure stable receiving quality of a signal that arrives at a receive end, power control needs to be performed. The power control is classified into inner loop power control and outer loop power control. The inner loop power control is classified into uplink inner loop power control and downlink inner loop power control. The uplink inner loop power control is to perform power control on an uplink channel used by a terminal. A TPC (transmission power control) command word used in the uplink power control is referred to as an uplink TPC command, which is transmitted on a downlink channel to indicate "increasing uplink transmit power" or "decreasing the uplink transmit power".

Currently, an uplink inner loop power control process is: A base station sends an uplink TPC command by using an F-DPCH (fractional dedicated physical channel), and a terminal determines, according to a received uplink TPC command, whether to adjust transmit power of an uplink DPCCH (dedicated physical control channel).

In a radio frame, for F-DPCHs of multiple terminals, sending is performed in a same timeslot. Each terminal is corresponding to one F-DPCH. There are multiple timeslot formats for the F-DPCH, and the F-DPCH of each terminal may be configured with one of the multiple timeslot formats. In one timeslot, locations of uplink TPC commands of a maximum of 10 terminals may be staggered.

SUMMARY

Embodiments of the present invention provide a configuration method for transmitting TPC command, a TPC command transmission method, and an apparatus, which are used to indicate a sending timeslot of an uplink TPC command.

According to a first aspect, a radio network controller is provided, including:

a sending unit, configured to send indication information to a terminal and a serving base station of the terminal, where the indication information is used to indicate a sending timeslot of an uplink transmission power control TPC command of the terminal.

With reference to the first aspect, in a first possible implementation manner, if M cells serve the terminal and M is an integer greater than 1, sending timeslots that are used in the M cells to send uplink TPC commands to the terminal are different from each other.

With reference to the first aspect or the first possible implementation manner of the first aspect, in a second possible implementation manner, in sending timeslots that are of uplink TPC commands and that are indicated by the sending unit for N terminals, sending timeslots of uplink TPC commands of at least two terminals are different from each other, where N is an integer greater than 1.

With reference to the second possible implementation manner of the first aspect, in a third possible implementation manner, in the sending timeslots that are of the uplink TPC commands and that are indicated by the sending unit for the N terminals, the sending timeslots of the uplink TPC commands of the N terminals are different from each other.

With reference to the second possible implementation manner of the first aspect, in a fourth possible implementation manner, in the sending timeslots that are of the uplink TPC commands and that are indicated by the sending unit for the N terminals, if sending timeslots of K terminals in the N terminals are the same, locations of uplink TPC commands of the K terminals in a timeslot are different from each other, where K is an integer greater than 2 and less than or equal to N.

With reference to the first aspect or any one of the first to the fourth possible implementation manners of the first aspect, in a fifth possible implementation manner, the indication information includes a timeslot number or offset of the timeslot number.

With reference to the first aspect or any one of the first to the fourth possible implementation manners of the first aspect, in a sixth possible implementation manner, the indication information includes a timeslot number and information about a location of an uplink TPC command in a timeslot corresponding to the timeslot number; or offset of a timeslot number and information about a location of an uplink TPC command in a timeslot corresponding to the offset of the timeslot number.

According to a second aspect, a base station is provided, including:

a receiving unit, configured to receive indication information sent by a radio network controller, where the indication information is used to indicate a sending timeslot of an uplink transmission power control TPC command of a terminal; and a TPC control unit, configured to send an uplink TPC command to the terminal according to the indication information.

With reference to the second aspect, in a first possible implementation manner, the indication information includes sending timeslots that are of multiple uplink TPC commands and that are allocated to the terminal, where the sending timeslots of the multiple uplink TPC commands are in one-to-one correspondence with cells that are under the base station and that serve the terminal, and the term "multiple" refers to two or more.

With reference to the second aspect or the first possible implementation manner of the second aspect, in a second possible implementation manner, in sending timeslots that are of uplink TPC commands and that are indicated for N terminals, sending timeslots of uplink TPC commands of at least two terminals are different from each other, where N is an integer greater than 1.

With reference to the second possible implementation manner of the second aspect, in a third possible implementation manner, the sending timeslots of the uplink TPC commands of the N terminals are different from each other.

With reference to the second possible implementation manner of the second aspect, in a fourth possible implementation manner, if sending timeslots of uplink TPC commands of K terminals in the N terminals are the same, locations of the uplink TPC commands of the K terminals in a timeslot are different from each other, where K is an integer less than or equal to N.

With reference to the second aspect or any one of the first to the fourth possible implementation manners of the second aspect, in a fifth possible implementation manner, the indication information includes a timeslot number or offset of the timeslot number; and the TPC control unit is specifically configured to determine a corresponding timeslot according to a timeslot number corresponding to the terminal or offset of the timeslot number, and send, in a determined timeslot, an uplink TPC command to the terminal.

With reference to the second aspect or the first to the fourth possible implementation manners of the aspect, in s sixth possible implementation manner, the indication information includes a timeslot number and information about a location of an uplink TPC command in a timeslot corresponding to the timeslot number; and the TPC control unit is specifically configured to send, at a corresponding location in a corresponding timeslot, an uplink TPC command to the terminal according to a timeslot number corresponding to the terminal and information about a location of the uplink TPC command in a timeslot corresponding to the timeslot number; or the indication information includes offset of a timeslot number and information about a location of an uplink TPC command in a timeslot corresponding to the offset of the timeslot number; and the TPC control unit is specifically configured to send, at a corresponding location in a corresponding timeslot, an uplink TPC command to the terminal according to offset of a timeslot number corresponding to the terminal and information about a location of the uplink TPC command in a timeslot corresponding to offset of the timeslot number.

According to a third aspect, a terminal is provided, including:

a receiving unit, configured to receive indication information sent by a radio network controller, where the indication information is used to indicate a sending timeslot of an uplink TPC command of the terminal; and a power setting unit, configured to receive an uplink TPC command according to the indication information.

With reference to the third aspect, in a first possible implementation manner, indication information received by the receiving unit includes sending timeslots of multiple uplink TPC commands of the terminal, where the sending timeslots of the multiple uplink TPC commands are in one-to-one correspondence with cells of a corresponding quantity that are under a base station and that serve a same terminal, and the term "multiple" refers to two or more; or the receiving unit receives multiple indication information that is sent by the network controller and that is used to indicate a sending timeslot of an uplink TPC command, where sending timeslots that are of multiple uplink TPC commands and that are indicated by the multiple indication information are in one-to-one correspondence with cells of a corresponding quantity that are under a base station and that serve a same terminal, and the term "multiple" refers to two or more.

With reference to the first possible implementation manner of the third aspect, in a second possible implementation manner, in sending timeslots that are of uplink TPC commands and that are indicated by the radio network controller for N terminals, sending timeslots of uplink TPC commands of at least two terminals are different from each other, where N is an integer greater than 1.

With reference to the second possible implementation manner of the third aspect, in a third possible implementation manner, the sending timeslots of the uplink TPC commands of the N terminals are different from each other.

With reference to the second possible implementation manner of the third aspect, in a fourth possible implementation manner, if sending timeslots of the uplink TPC command of the terminal and an uplink TPC command of at least one another terminal in the N terminals are the same, a location of the uplink TPC command of the terminal and a location of an uplink TPC command of at least one another terminal that are in a timeslot are different from each other.

With reference to the third aspect or the first to the fourth possible implementation manners of the third aspect, in a fifth possible implementation manner, the indication information includes a timeslot number or offset of the timeslot number; and the power setting unit is specifically configured to determine a corresponding timeslot according to the timeslot number or the offset of the timeslot number, and receive, in a determined timeslot, an uplink TPC command.

With reference to the third aspect or the first to the fourth possible implementation manners of the third aspect, in a sixth possible implementation manner, the indication information includes a timeslot number and information about a location of an uplink TPC command in a timeslot corresponding to the timeslot number; and the power setting unit is specifically configured to receive, in the timeslot corresponding to the timeslot number and at a location indicated by the location information, an uplink TPC command; or the indication information includes offset of a timeslot number and information about a location of an uplink TPC command in a timeslot corresponding to the offset of the timeslot number; and the power setting unit is specifically configured to receive, in the timeslot corresponding to the offset of the timeslot number and at a location indicated by the location information, an uplink TPC command.

According to a fourth aspect, a configuration method for transmitting TPC command is provided, including:

sending, by a radio network controller, indication information to a terminal and a serving base station of the terminal, where the indication information is used to indicate a sending timeslot of an uplink TPC command of the terminal.

With reference to the fourth aspect, in a first possible implementation manner, if M cells serve the terminal and M is an integer greater than 1, sending timeslots that are used in the M cells to send uplink TPC commands to the terminal are different from each other.

With reference to the fourth aspect or the first possible implementation manner of the fourth aspect, in a second possible implementation manner, in sending timeslots that are of uplink TPC commands and that are indicated for N terminals, sending timeslots of uplink TPC commands of at least two terminals are different from each other, where N is an integer greater than 1.

With reference to the second possible implementation manner of the fourth aspect, in a third possible implementation manner, the sending timeslots of the uplink TPC commands of the N terminals are different from each other.

With reference to the second possible implementation manner of the fourth aspect, in a fourth possible implementation manner, if sending timeslots of K terminals in the N terminals are the same, locations of uplink TPC commands of the K terminals in a timeslot are different from each other, where K is an integer greater than 2 and less than or equal to N.

With reference to the fourth aspect or any one of the first to the fourth possible implementation manners of the fourth aspect, in a fifth possible implementation manner, the indication information includes a timeslot number or offset of the timeslot number.

With reference to the fourth aspect or any one of the first to the fourth possible implementation manners of the fourth aspect, in a sixth possible implementation manner, the indication information includes:

a timeslot number and information about a location of an uplink TPC command in a timeslot corresponding to the timeslot number; or offset of a timeslot number and information about a location of an uplink TPC command in a timeslot corresponding to the offset of the timeslot number.

According to a fifth aspect, a TPC command transmission method is provided, including:

receiving, by a base station, indication information sent by a radio network controller, where the indication information is used to indicate a sending timeslot of an uplink TPC command of a terminal; and sending, by the base station, an uplink TPC command to the terminal according to the indication information.

With reference to the fifth aspect, in a first possible implementation manner, the indication information includes sending timeslots that are of multiple uplink TPC commands and that are allocated to the terminal, where the sending timeslots of the multiple uplink TPC commands are in one-to-one correspondence with cells that are under the base station and that serve the terminal, and the term "multiple" refers to two or more.

With reference to the fifth aspect or the first possible implementation manner of the fifth aspect, in a second possible implementation manner, in sending timeslots that are of uplink TPC commands and that are indicated for N terminals, sending timeslots of uplink TPC commands of at least two terminals are different from each other, where N is an integer greater than 1.

With reference to the second possible implementation manner of the fifth aspect, in a third possible implementation manner, the sending timeslots of the uplink TPC commands of the N terminals are different from each other.

With reference to the second possible implementation manner of the fifth aspect, in a fourth possible implementation manner, if sending timeslots of uplink TPC commands of K terminals in the N terminals are the same, locations of the uplink TPC commands of the K terminals in a timeslot are different from each other, where K is an integer less than or equal to N.

With reference to the fifth aspect or any one of the first to the fourth possible implementation manners of the fifth aspect, in a fifth possible implementation manner, the indication information includes a timeslot number or offset of the timeslot number; and the sending, by the base station, an uplink TPC command to the terminal according to the indication information includes:

determining, by the base station, a corresponding timeslot according to a timeslot number corresponding to the terminal or offset of the timeslot number; and sending, in a determined timeslot, an uplink TPC command to the terminal.

With reference to the fifth aspect or any one of the first to the fourth possible implementation manners of the fifth aspect, in a sixth possible implementation manner, the indication information includes a timeslot number and information about a location of an uplink TPC command in a timeslot corresponding to the timeslot number; and the sending, by the base station, an uplink TPC command to the terminal according to the indication information includes: sending, at a corresponding location in a corresponding timeslot by the base station, an uplink TPC command to the terminal according to a timeslot number corresponding to the terminal and information about a location of the uplink TPC command in a timeslot corresponding to the timeslot number; or the indication information includes offset of a timeslot number and information about a location of an uplink TPC command in a timeslot corresponding to the offset of the timeslot number; and the sending, by the base station, an uplink TPC command to the terminal according to the indication information includes: sending, at a corresponding location in a corresponding timeslot by the base station, an uplink TPC command to the terminal according to offset of a timeslot number corresponding to the terminal and the information about a location of the uplink TPC command in a timeslot corresponding to the offset of the timeslot number.

According to a sixth aspect, a TPC command transmission method is provided, including:

receiving, by a terminal, indication information sent by a radio network controller, where the indication information is used to indicate a sending timeslot of an uplink TPC command of a terminal; and receiving, by the terminal, an uplink TPC command according to the indication information.

With reference to the sixth aspect, in a first possible implementation manner, indication information received by the terminal includes sending timeslots of multiple uplink TPC commands of the terminal, where the sending timeslots of the multiple uplink TPC commands are in one-to-one correspondence with cells of a corresponding quantity that are under a base station and that serve a same terminal, and the term "multiple" refers to two or more; or the terminal receives multiple indication information that is sent by the network controller and that is used to indicate a sending timeslot of an uplink TPC command, where the sending timeslots that are of the multiple uplink TPC commands and that are indicated by the multiple indication information are in one-to-one correspondence with cells of a corresponding quantity that are under a base station and that serve a same terminal, and the term "multiple" refers to two or more.

With reference to the sixth aspect or the first possible implementation manner of the sixth aspect, in a second possible implementation manner, in sending timeslots that are of uplink TPC commands and that are indicated by the radio network controller for N terminals, sending timeslots of uplink TPC commands of at least two terminals are different from each other, where N is an integer greater than 1.

With reference to the second possible implementation manner of the sixth aspect, in a third possible implementation manner, the sending timeslots of the uplink TPC commands of the N terminals are different from each other.

With reference to the second possible implementation manner of the sixth aspect, in a fourth possible implementation manner, if sending timeslots of the uplink TPC command of the terminal and an uplink TPC command of at least one another terminal in the N terminals are the same, a location of the uplink TPC command of the terminal and a location of the uplink TPC command of the at least one another terminal that are in a timeslot are different from each other.

With reference to the sixth aspect or any one of the first to the fourth possible implementation manners of the sixth aspect, in a fifth possible implementation manner, the indication information includes a timeslot number or offset of the timeslot number; and the receiving, by the terminal, an uplink TPC command according to the indication information includes:

determining, by the terminal, a corresponding timeslot according to the timeslot number or the offset of the timeslot number, and receiving, in a determined timeslot, an uplink TPC command.

With reference to the sixth aspect or the first to the fourth possible implementation manners of the sixth aspect, in a sixth possible implementation manner, the indication information includes a timeslot number and information about a location of an uplink TPC command in a timeslot corresponding to the timeslot number; and the receiving, by the terminal, an uplink TPC command according to the indication information includes: receiving, in the timeslot corresponding to the timeslot number and at a location indicated by the location information by the terminal, the uplink TPC command; or the indication information includes offset of a timeslot number and information about a location of an uplink TPC command in a timeslot corresponding to the offset of the timeslot number; and the receiving, by the terminal, an uplink TPC command according to the indication information includes: receiving, in the timeslot corresponding to the offset of the timeslot number and at a location indicated by the location information by the terminal, the uplink TPC command.

According to a seventh aspect, a radio network controller is provided, including:

a transmission interface, configured to perform information interaction with another device, including sending information and receiving information;

a memory, configured to store one or more executable programs, which are used to configure a processor; and a processor configured with one or more executable programs, where the one or more executable programs are used to perform the method of the fourth aspect or one method of the first to the sixth possible implementation manners of the fourth aspect.

According to an eighth aspect, a base station is provided, including:

a radio frequency unit, configured to perform communication with a terminal by using an antenna;

a baseband processing unit, configured to perform baseband processing;

a memory storing one or more executable programs, which are used to configure a processor; and a processor configured with one or more executable programs, where the one or more executable programs are used to perform the method of the fifth aspect or one method of the first to the sixth possible implementation manners of the fifth aspect.

According to a ninth aspect, a terminal is provided, including:

a radio frequency unit, configured to perform communication with a base station by using an antenna;

a baseband processing unit, configured to perform baseband processing;

a memory storing one or more executable programs, which are used to configure a processor; and a processor configured with one or more executable programs, where the one or more executable programs are used to perform the method of the sixth aspect or one method of the first to the sixth possible implementation manners of the sixth aspect.

In the foregoing embodiments of the present invention, a radio network controller sends indication information to a terminal and a serving base station of the terminal to indicate a sending timeslot of an uplink TPC command of the terminal, so that indicating of the sending timeslot of the uplink TPC command is implemented, and a prerequisite is provided for different terminals to indicate sending timeslots of different uplink TPC commands.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The following embodiments of the present invention use a UMTS of a WCDMA technology as an example for description.

Figure 1:
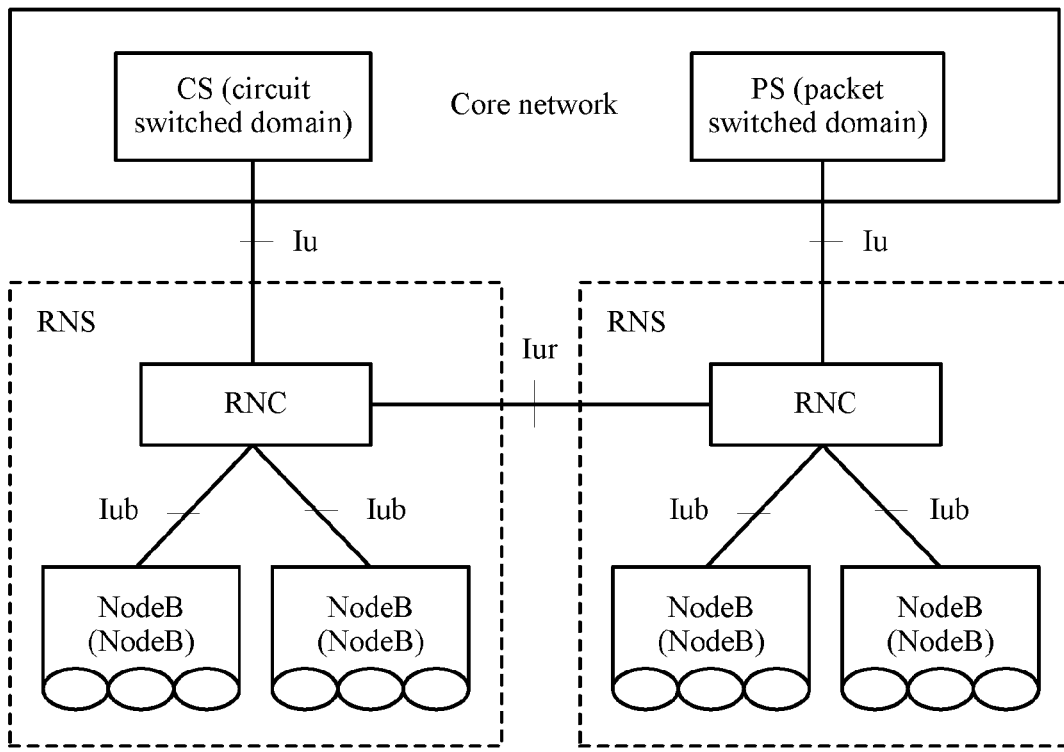
FIG. 1 is a schematic diagram of a system architecture according to an embodiment of the present invention.

Referring to FIG. 1, FIG. 1 is a schematic diagram of an architecture of an access network UTRAN (UMTS Terrestrial Radio Access Network) in a UMTS.

The UTRAN includes one or more RNSs (radio network subsystem). An RNS includes one RNC (radio network controller) and one or more NodeBs. The RNC is connected to the NodeB by using an Iub interface, and the NodeB is connected to UE (user equipment, that is, a terminal) by using a Uu interface. Inside the UTRAN, RNCs are connected to each other by using an Iur interface. The RNC is configured to allocate and control a radio resource of a NodeB connected or associated to the RNC. The NodeB completes conversion of a data flow between the Iub interface and the Uu interface, and also participates in partial radio resource management.

In this embodiment, the RNC, the base station, and the terminal of the architecture are improved, so that: the RNC indicates a sending timeslot of an uplink TPC command when the RNC allocates transmit resources of the uplink TPC commands to the terminal and the base station, and locations that are of TPC fields of downlink channels of each terminal and that are used to carry uplink TPC commands are staggered as much as possible to reduce a TPC peak-to-average ratio; the base station identifies indication information of a sending timeslot that is of an uplink TPC command and that is sent by the RNC, so that the base station sends, at a corresponding location, an uplink TPC command to a corresponding terminal; and the terminal identifies the indication information of the sending timeslot that is of the uplink TPC command and that is sent by the RNC, so that the terminal receives, at a corresponding location, an uplink TPC command.

The following respectively describes the RNC, the base station, and the terminal that are provided in the embodiments of the present invention with reference to the accompanying drawings.

Figure 2:
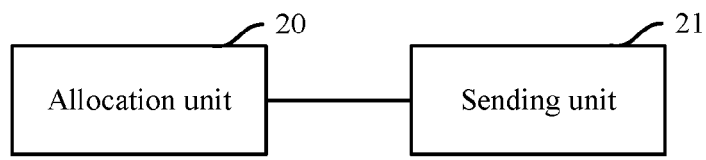
FIG. 2 is a schematic structural diagram of a radio network controller according to an embodiment of the present invention.

Referring to FIG. 2, FIG. 2 is a schematic structural diagram of an RNC according to an embodiment of the present invention. As shown in the figure, the RNC may include a sending unit 21, and may further include an allocation unit 20.

The sending unit 21 is configured to send indication information to a terminal and a serving base station of the terminal, where the indication information is used to indicate a sending timeslot of an uplink TPC command of the terminal. The allocation unit 20 is configured to allocate a sending timeslot for the uplink TPC command of the terminal.

Preferably, if M cells serve the terminal and M is an integer greater than 1, sending timeslots that are used in the M cells to send uplink TPC commands to the terminal are different from each other.

In sending timeslots that are of uplink TPC commands and that are allocated by the allocation unit 20 to N terminals, sending timeslots of uplink TPC commands of at least two terminals are different from each other, where N is an integer greater than 1. Correspondingly, in sending timeslots that are of uplink TPC commands and that are allocated by the sending unit 21 to N terminals, sending timeslots of uplink TPC commands of at least two terminals are different from each other.

Preferably, the sending timeslots of the uplink TPC commands of the N terminals are different from each other. For example, each timeslot of 15 timeslots of one WCDMA radio frame is allocated to a downlink F-DPCH of one terminal, so that 15 timeslots of one radio frame are allocated to downlink F-DPCHs of 15 terminals. Downlink F-DPCHs of different terminals are allocated different timeslots, and the downlink F-DPCHs of different terminals can be configured with a same or different timeslot formats.

Preferably, if sending timeslots of K terminals in the N terminals are the same, locations of uplink TPC commands of the K terminals in a timeslot are different from each other, where K is an integer greater than 2 and less than or equal to N. For example, each timeslot of the 15 timeslots of one WCDMA radio frame is allocated to downlink F-DPCHs of 10 terminals, and for all downlink F-DPCHs that are allocated a same timeslot, timeslot formats of the downlink F-DPCHs are different from each other, that is, locations of TPC fields in the timeslot are different from each other, so that the 15 timeslots of one radio frame can be allocated to downlink F-DPCHs of a maximum of 150 terminals, and it is ensured that locations of uplink TPC commands of all terminals in the radio frame are different from each other.

Preferably, the indication information includes a timeslot number or offset of the timeslot number; or the indication information includes a timeslot number and information about a location of an uplink TPC command in a timeslot corresponding to the timeslot number; or the indication information includes offset of a timeslot number and information about a location of an uplink TPC command in a timeslot corresponding to the offset of the timeslot number.

Figure 3:
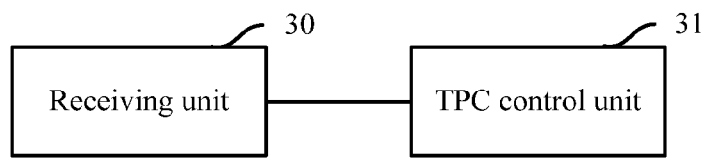
FIG. 3 is a schematic structural diagram of a base station according to an embodiment of the present invention.

Referring to FIG. 3, FIG. 3 is a schematic structural diagram of a base station according to an embodiment of the present invention. As shown in the figure, the base station may include a receiving unit 30 and a TPC control unit 31.

The receiving unit 30 is configured to receive indication information sent by a radio network controller, where the indication information is used to indicate a sending timeslot of an uplink TPC command of a terminal. The TPC control unit 31 is configured to send an uplink TPC command to the terminal according to the indication information.

A manner in which an RNC sends indication information, and content and meaning of the indication information are the same as those described above.

Figure 4:
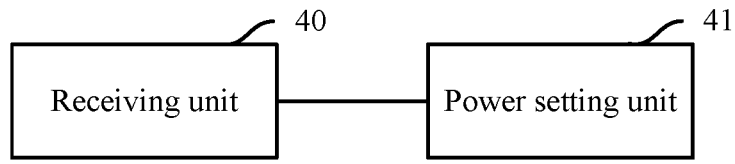
FIG. 4 is a schematic structural diagram of a terminal according to an embodiment of the present invention.

Referring to FIG. 4, FIG. 4 is a schematic structural diagram of a terminal according to an embodiment of the present invention. As shown in the figure, the terminal may include a receiving unit 40 and a power setting unit 41.

The receiving unit 40 is configured to receive indication information sent by an RNC, where the indication information is used to indicate a sending timeslot of an uplink TPC command of the terminal. The power setting unit 41 is configured to receive an uplink TPC command according to the indication information.

A manner in which the RNC sends indication information, and content and meaning of the indication information are the same as those described above.

Figure 5:
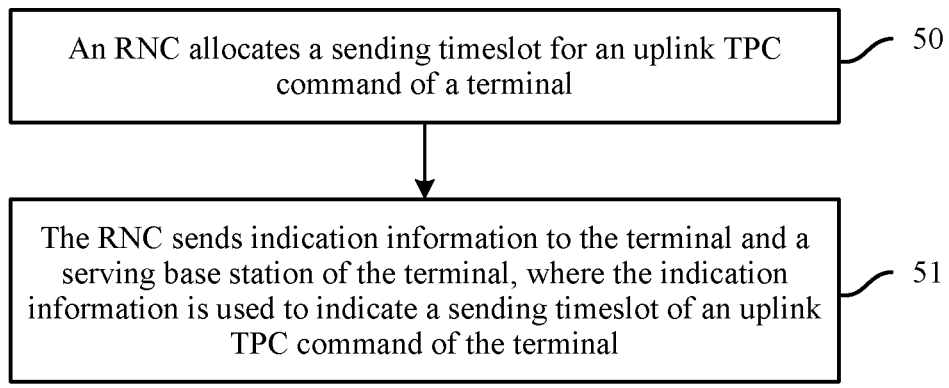
FIG. 5 is a schematic flowchart of configuration of TPC command transmission according to an embodiment of the present invention.

Based on the foregoing system architecture and a structure of the RNC, FIG. 5 shows a process on an RNC side according to an embodiment of the present invention. As shown in the figure, the process may include:

Step 51: An RNC sends indication information to a terminal and a serving base station of the terminal, where the indication information is used to indicate a sending timeslot of an uplink TPC command of the terminal. This step can be implemented by the sending unit in the RNC shown in FIG. 2.

Optionally, before step 51, the process may further include:

Step 50: The RNC allocates a sending timeslot for the uplink TPC command of the terminal. This step can be implemented by the allocation unit in the RNC shown in FIG. 2.

Preferably, to enable uplink TPC commands of different terminals to be staggered in a timeslot, in sending timeslots that are of uplink TPC commands and that are indicated for N terminals, sending timeslots of uplink TPC commands of at least two terminals are different from each other, where N is an integer greater than 1.

Preferably, to try best to enable the uplink TPC commands of different terminals to be staggered in a timeslot to reduce a TPC peak-to-average ratio, the sending timeslots of the uplink TPC commands of the N terminals are different from each other.

Certainly, sending timeslots of uplink TPC commands of K (K≤N) terminals in the N terminals may be the same. In this case, to reduce the TPC peak-to-average ratio, different locations may be allocated in the same sending timeslot for the uplink TPC commands of the K terminals, that is, different timeslot formats are allocated to make locations of the uplink TPC commands of the K terminals in the timeslot different from each other. Considering that in one timeslot, locations of uplink TPC commands of a maximum of 10 terminals may be staggered, and therefore, preferably, uplink TPC commands of a maximum of 10 terminals can be allocated a same sending timeslot. In this sending timeslot, locations of the uplink TPC commands of the 10 terminals are staggered from each other, and therefore, locations of uplink TPC commands of a maximum of 10*Q terminals in Q timeslots may be staggered. That a radio frame in a WCDMA system has 15 timeslots is used as an example. In this case, in one radio frame in the WCDMA system, locations of uplink TPC commands of a maximum of 150 terminals may be staggered.

In step 51, the RNC sends the indication information to the terminal and the serving base station of the terminal, so that the terminal receives an uplink TPC command according to an indicated location, and the serving base station of the terminal sends an uplink TPC command to the terminal according to the indicated location. Preferably, manners in which the RNC sends the indication information to the terminal and the serving base station of the terminal may include the following:

Manner 1: The RNC sends the indication information to the terminal and the serving base station of the terminal, where the indication information includes a timeslot number;

Manner 2: The RNC sends the indication information to the terminal and the serving base station of the terminal, where the indication information includes offset of a timeslot number;

Manner 3: The RNC sends the indication information to the terminal and the serving base station of the terminal, where the indication information includes a timeslot number and information about a location of an uplink TPC command in a timeslot corresponding to the timeslot number; and Manner 4: The RNC sends the indication information to the terminal and the serving base station of the terminal, where the indication information includes offset of a timeslot number and information about a location of an uplink TPC command in a timeslot corresponding to the offset of the timeslot number.

In a case in which the foregoing manner 2 is used, in a specific implementation process, the RNC allocates a slot offset parameter to the terminal, where the slot offset parameter is the offset of the timeslot number and is used to indicate a sending timeslot that is of a TPC command and that is allocated to the terminal; the RNC sends a configuration message to the terminal, where the configuration message carries the slot offset parameter allocated to the terminal. Because the configuration message sent by the RNC to the terminal needs to be sent to the terminal by using a base station, the base station may acquire the slot offset parameter allocated by the RNC to the terminal, so as to learn the sending timeslot of the uplink TPC command of the terminal.

Figure 8:
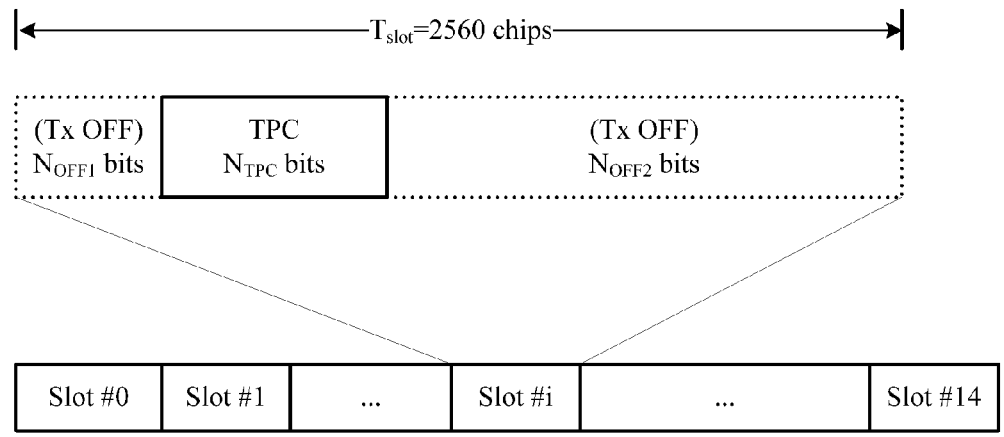
FIG. 8 is a schematic structural diagram of an F-DPCH frame.

The RNC configures, for the terminal, a timeslot format that is of a downlink channel and that is used to carry an uplink TPC command, which may be performed in a manner stipulated currently in a protocol. For example, the RNC may configure an F-DPCH for the terminal; there are multiple timeslot formats for the F-DPCH, and the F-DPCH of each terminal may be configured with one of the multiple timeslot formats. FIG. 8 shows a schematic structural diagram of an F-DPCH frame. It may be seen that each F-DPCH includes one TPC field that is of an $N_{TPC}$ bit length. For uplink inner loop power control, the TPC field is used to carry an uplink TPC command word. Table 1 shows various F-DPCH timeslot formats.

TABLE 1

| | | F-DPCH timeslot formats | | | | | |
|---|---|---|---|---|---|---|---|
| Timeslot format | Channel bit rate (unit: kbps) | Channel symbol rate (unit: kbps) | Spreading factor | Bit/Timeslot | $N_{OFF1}$ Bit/Timeslot | $N_{TPC}$ Bit/Timeslot | $N_{OFF2}$ Bit/Timeslot |
| 0 | 3 | 1.5 | 256 | 20 | 2 | 2 | 16 |
| 1 | 3 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |
| 4 | 3 | 1.5 | 256 | 20 | 10 | 2 | 8 |

TABLE 1-continued

F-DPCH timeslot formats

| Timeslot format | Channel bit rate (unit: kbps) | Channel symbol rate (unit: kbps) | Spreading factor | Bit/Timeslot | $N_{OFF1}$ Bit/Timeslot | $N_{TPC}$ Bit/Timeslot | $N_{OFF2}$ Bit/Timeslot |
|---|---|---|---|---|---|---|---|
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

In Table 1, $N_{TPC}$ represents a quantity of bits of a TPC field in each timeslot. $N_{OFF1}$ represents a quantity of bits of the TPC field in each timeslot to a start boundary of each timeslot. $N_{OFF2}$ represents a quantity of bits of the TPC field in each timeslot to an end boundary of each timeslot, that is, $N_{OFF1}$ and $N_{OFF2}$ are used to define a location of the TPC field in a timeslot.

A specific implementation process in which the foregoing manner 1 is used is similar to the specific implementation process in which the manner 2 is used, and details are not described herein.

In a case in which the foregoing manner 3 is used, in a specific implementation process, the RNC allocates a slot format (that is, a timeslot format that is of a downlink channel and that is used to carry an uplink TPC command) to the terminal, where a slot index, $N_{OFF1}$, and $NOFF_2$ are included, where the slot index is a timeslot number of a sending timeslot of an uplink TPC command, and $N_{OFF1}$ and $NOFF_2$ are used to define a location of a TPC field in a timeslot. The RNC sends a configuration message to the terminal, where the configuration message carries the slot index, $N_{OFF1}$, and $N_{OFF2}$ allocated to the terminal. Because the configuration message sent by the RNC to the terminal needs to be sent to the terminal by using a base station, the base station may acquire parameters such as the slot index, $N_{OFF1}$, and $N_{OFF2}$, or configuration information allocated by the RNC to the terminal, so as to learn configuration information such as the sending timeslot of the uplink TPC command of the terminal.

Preferably, Table 2 shows an F-DPCH timeslot format, and the RNC may allocate and indicate a slot index, $N_{OFF1}$, and $N_{OFF2}$ to the terminal according to the F-DPCH timeslot format table.

TABLE 2

F-DPCH timeslot formats

| Timeslot format #i | Timeslot number | Channel bit rate (unit: kbps) | Channel symbol rate (unit: kbps) | Spreading factor | Bit/Timeslot | $N_{OFF1}$ Bit/Timeslot | $N_{TPC}$ Bit/Timeslot | $N_{OFF2}$ Bit/Timeslot |
|---|---|---|---|---|---|---|---|---|
| 0 | 0 | 3 | 1.5 | 256 | 20 | 2 | 2 | 16 |
| 1 | 0 | 3 | 1.5 | 256 | 20 | 4 | 2 | 14 |
| 2 | 0 | 3 | 1.5 | 256 | 20 | 6 | 2 | 12 |
| 3 | 0 | 3 | 1.5 | 256 | 20 | 8 | 2 | 10 |
| 4 | 0 | 3 | 1.5 | 256 | 20 | 10 | 2 | 8 |
| 5 | 0 | 3 | 1.5 | 256 | 20 | 12 | 2 | 6 |
| 6 | 0 | 3 | 1.5 | 256 | 20 | 14 | 2 | 4 |
| 7 | 0 | 3 | 1.5 | 256 | 20 | 16 | 2 | 2 |
| 8 | 0 | 3 | 1.5 | 256 | 20 | 18 | 2 | 0 |
| 9 | 0 | 3 | 1.5 | 256 | 20 | 0 | 2 | 18 |
| ... | ... | ... | ... | ... | ... | ... | ... | ... |
| 0 | N − 1 | 3 | 1.5 | 256 | 20 | 2 | 2 | 16 |
| 1 | N − 1 | 3 | 1.5 | 256 | 20 | 4 | 2 | 14 |
| 2 | N − 1 | 3 | 1.5 | 256 | 20 | 6 | 2 | 12 |
| 3 | N − 1 | 3 | 1.5 | 256 | 20 | 8 | 2 | 10 |
| 4 | N − 1 | 3 | 1.5 | 256 | 20 | 10 | 2 | 8 |
| 5 | N − 1 | 3 | 1.5 | 256 | 20 | 12 | 2 | 6 |
| 6 | N − 1 | 3 | 1.5 | 256 | 20 | 14 | 2 | 4 |
| 7 | N − 1 | 3 | 1.5 | 256 | 20 | 16 | 2 | 2 |
| 8 | N − 1 | 3 | 1.5 | 256 | 20 | 18 | 2 | 0 |
| 9 | N − 1 | 3 | 1.5 | 256 | 20 | 0 | 2 | 18 |

A specific implementation process in which the foregoing manner 4 is used is similar to the specific implementation process in which the manner 3 is used, and details are not described herein.

Further, in another embodiment, based on the foregoing embodiments and considering that in a scenario of soft handover, multiple cells may serve a same terminal; for example, M cells serve a same terminal, and the M cells may belong to one or more base stations. In this case, sending timeslots that are used in the M cells to send the uplink TPC commands to a same terminal are different from each other.

For example, an RNC allocates sending timeslots of M uplink TPC commands to the M cells, where the sending timeslots of the M uplink TPC commands are used for sending uplink TPC commands to a same terminal served by the M cells, and the sending timeslots that are used in the M cells to send the TPC commands to the same terminal are different from each other; the RNC sends indication information to the same terminal and base stations of the M cells, where the indication information is used to indicate a sending timeslot that is of an uplink TPC command and that is allocated to the same terminal. A specific implementation manner in which the RNC sends indication information to the terminal and the base station may use the implementation manners of the foregoing embodiments, and details are not described herein.

It may be seen from the foregoing description that, an RNC sends indication information to a terminal and a serving base station of the terminal to indicate a sending timeslot of an uplink TPC command of the terminal, so that indicating of the sending timeslot of the uplink TPC command is implemented, and a prerequisite is provided for different terminals to indicate sending timeslots of different uplink TPC commands. Further, the RNC sends indication information to N terminals and serving base stations of the N terminals to indicate sending timeslots of uplink TPC commands of the N terminals, and sending timeslots of uplink TPC commands of at least two terminals of the N terminals are different, so that the uplink TPC commands of the N terminals are staggered in a timeslot. In this way, even if F-DPCHs of multiple terminals are configured with a same timeslot format, it can be avoided that locations of the uplink TPC commands are the same, and further a TPC peak-to-average ratio is lower than that in the prior art.

Figure 6:
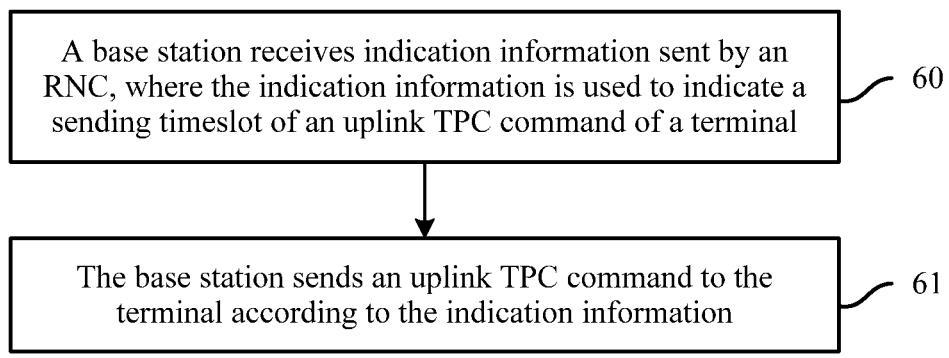
FIG. 6 is a first schematic flowchart of TPC command transmission according to an embodiment of the present invention.

Based on the foregoing system architecture and the schematic structural diagram of the base station, FIG. 6 shows a process on a base station side according to an embodiment of the present invention. As shown in FIG. 6, the process may include:

Step 60: A base station receives indication information sent by an RNC, where the indication information is used to indicate a sending timeslot of an uplink TPC command of a terminal. This step can be implemented by the receiving unit in the base station shown in FIG. 3.

Step 61: The base station sends an uplink TPC command to the terminal according to the indication information. This step can be implemented by the TPC control unit in the base station shown in FIG. 3.

Preferably, to enable uplink TPC commands of different terminals to be staggered in a timeslot, in sending timeslots that are of uplink TPC commands and that are indicated for N terminals, sending timeslots of uplink TPC commands of at least two terminals are different from each other, where N is an integer greater than 1. N herein only indicates that a quantity of the terminal is more than one, but the quantity is not specifically limited.

A manner in which the RNC sends indication information to the base station, and content and meaning of the indication information are the same as those in relevant description in the process shown in FIG. 5.

For example, the sending timeslots that are of the uplink TPC commands of the N terminals and that are indicated by the RNC are different from each other.

For another example, if sending timeslots of uplink TPC commands of K (K≤N) terminals in the N terminals are the same, locations of the uplink TPC commands of the K terminals in a timeslot are different from each other.

For another example, in a case in which sending timeslots of multiple uplink TPC commands are allocated to a same terminal, the sending timeslots of the multiple uplink TPC commands are in one-to-one correspondence with cells that are under a base station and that serve the same terminal, that is, multiple cells that serve the same terminal send uplink TPC commands to the terminal by using different timeslots. The term "multiple" refers to two or more.

If the RNC sends indication information in the foregoing manner 1, in step 61, the base station determines a corresponding timeslot according to a timeslot number corresponding to the terminal, and sends, in a determined timeslot, an uplink TPC command to the terminal.

If the RNC sends indication information in the foregoing manner 2, in step 61, the base station determines a corresponding timeslot according to offset of a timeslot number corresponding to the terminal, and sends, in a determined timeslot, an uplink TPC command to the terminal.

If the RNC sends indication information in the foregoing manner 3, in step 61, the base station sends, at a corresponding location in a corresponding timeslot, an uplink TPC command to the terminal according to a timeslot number corresponding to the terminal and information about a location of an uplink TPC command in a timeslot corresponding to the timeslot number.

If the RNC sends indication information in the foregoing manner 4, in step 61, the base station sends, at a corresponding location in a corresponding timeslot, an uplink TPC command to the terminal according to offset of a timeslot number corresponding to the terminal and information about a location of an uplink TPC command in a timeslot corresponding to the offset of the timeslot number.

It may be seen from the foregoing description that, an RNC sends indication information to a terminal and a serving base station of the terminal to indicate a sending timeslot of an uplink TPC command of the terminal, so that indicating of the sending timeslot of the uplink TPC command is implemented, and a prerequisite is provided for different terminals to indicate sending timeslots of different uplink TPC commands. Further, the RNC sends indication information to N terminals and serving base stations of the N terminals to indicate sending timeslots of uplink TPC commands of the N terminals, and sending timeslots of uplink TPC commands of at least two terminals of the N terminals are different, so that the uplink TPC commands of the N terminals are staggered in a timeslot. In this way, even if F-DPCHs of multiple terminals are configured with a same timeslot format, it can be avoided that locations of the uplink TPC commands are the same, and further a TPC peak-to-average ratio is lower than that in the prior art.

Figure 7:
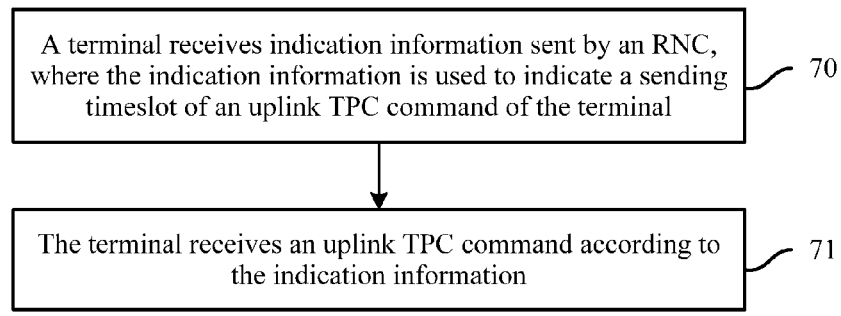
FIG. 7 is a second schematic flowchart of TPC command transmission according to an embodiment of the present invention.

Based on the foregoing system architecture and the schematic structural diagram of the terminal, FIG. 7 shows a process on a terminal side according to an embodiment of the present invention. As shown in FIG. 7, the process may include:

Step 70: A terminal receives indication information sent by an RNC, where the indication information is used to indicate a sending timeslot of an uplink TPC command of the terminal. This step can be implemented by the receiving unit in the terminal shown in FIG. 4.

Step 71: The terminal receives an uplink TPC command according to the indication information. This step can be implemented by the power setting unit in the terminal shown in FIG. 4.

Preferably, to enable uplink TPC commands of different terminals to be staggered in a timeslot, in sending timeslots that are of uplink TPC commands and that are indicated for N terminals, sending timeslots of uplink TPC commands of at least two terminals are different from each other, where N is an integer greater than 1. N herein only indicates that a quantity of the terminal is more than one, but the quantity is not specifically limited.

In the foregoing process, the manner in which the RNC sends indication information to the terminal, and content and meaning of the indication information are the same as those in relevant description in the process shown in FIG. 5.

For example, the sending timeslots that are of the uplink TPC commands of the N terminals and that are indicated by the RNC are different from each other.

For another example, if sending timeslots of the uplink TPC command of the terminal and uplink TPC commands of k (k≥1) other terminals in the N terminals are the same, locations of the uplink TPC command of the terminal and the uplink TPC commands of the K terminals that are in a timeslot are different from each other.

For another example, in a case in which Q (Q>1) cells under a same base station serve a same terminal, the RNC may send indication information to the terminal by using a configuration message, where sending timeslots of Q uplink TPC commands are indicated, and the Q cells are respectively corresponding to one sending timeslot, and sending timeslots corresponding to each cell are different from each other. In the case of the Q (Q>1) cells that are under the same base station and that serve the same terminal, the RNC may also send the indication information to the terminal by using Q configuration messages, where the sending timeslots of the Q uplink TPC commands are indicated by using the Q configuration messages, and the Q cells are respectively corresponding to one sending timeslot, and the sending timeslots corresponding to each cell are different from each other.

If the RNC sends indication information in the foregoing manner 1, in step 71, the terminal determines a corresponding timeslot according to a timeslot number, and receives, in a determined timeslot, the uplink TPC command.

If the RNC sends indication information in the foregoing manner 2, in step 71, the terminal determines a corresponding timeslot according to offset of a timeslot number, and receives, in a determined timeslot, the uplink TPC command.

If the RNC sends indication information in the foregoing manner 3, in step 71, the terminal receives, in a timeslot corresponding to a timeslot number, and at a location indicated by location information, the uplink TPC command.

If the RNC sends indication information in the foregoing manner 4, in step 71, the terminal receives, in a timeslot corresponding to offset of a timeslot number and at a location indicated by location information, the uplink TPC command.

It may be seen from the foregoing description that, an RNC sends indication information to a terminal and a serving base station of the terminal to indicate a sending timeslot of an uplink TPC command of the terminal, so that indicating of the sending timeslot of the uplink TPC command is implemented, and a prerequisite is provided for different terminals to indicate sending timeslots of different uplink TPC commands. Further, the RNC sends indication information to N terminals and serving base stations of the N terminals to indicate sending timeslots of uplink TPC commands of the N terminals, and sending timeslots of uplink TPC commands of at least two terminals of the N terminals are different, so that the uplink TPC commands of the N terminals are staggered in a timeslot. In this way, even if F-DPCHs of multiple terminals are configured with a same timeslot format, it can be avoided that locations of the uplink TPC commands are the same, and further a TPC peak-to-average ratio is lower than that in the prior art.

Based on a same technical concept, the embodiments of the present invention further provide an RNC, a base station, and a terminal.

Figure 9:
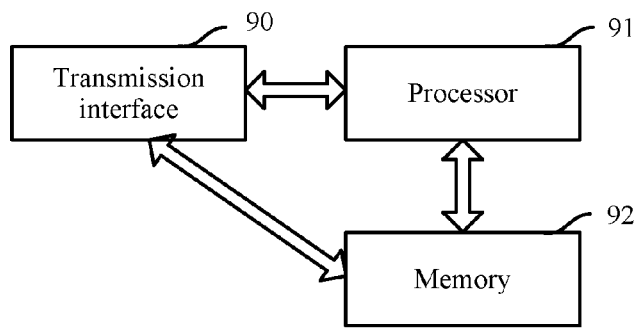
FIG. 9 is a schematic structural diagram of a radio network controller according to another embodiment of the present invention.

Referring to FIG. 9, FIG. 9 is a schematic structural diagram of an RNC according to another embodiment of the present invention. This schematic diagram shows a hardware structure of the RNC. A transmission interface 90 is configured to perform information interaction with another device, including sending information and receiving information; a processor 91 is configured to allocate and control a radio resource; a memory 92 is configured to store information and intermediate data required in various processing procedures.

The memory 92 is further configured to store one or more executable programs, which are used to configure the processor 91. The processor 91 is configured with one or more executable programs, where the one or more executable programs are used to execute the process shown in FIG. 5.

Specifically, the processor 91 sends indication information to a terminal and a serving base station of the terminal by using the transmission interface 90, where the indication information is used to indicate a sending timeslot of an uplink transmission power control TPC command of the terminal.

Preferably, if M cells serve the terminal (M is an integer greater than 1), sending timeslots that are used in the M cells to send uplink TPC commands to the terminal are different from each other.

Preferably, in sending timeslots that are of uplink TPC commands and that are indicated by the processor 91 for N terminals by using the transmission interface 90, sending timeslots of uplink TPC commands of at least two terminals are different from each other, where N is an integer greater than 1. Preferably, in the sending timeslots that are of the uplink TPC commands and that are indicated by the processor 91 for the N terminals by using the transmission interface 90, the sending timeslots of the uplink TPC commands of the N terminals are different from each other.

Preferably, in the sending timeslots that are of the uplink TPC commands and that are indicated by the processor 91 for the N terminals by using the transmission interface 90, if sending timeslots of K terminals in the N terminals are the same, locations of uplink TPC commands of the K terminals in a timeslot are different from each other, where K is an integer greater than 2 and less than or equal to N.

Preferably, indication information sent by the processor 91 by using the transmission interface 90 includes a timeslot number or offset of the timeslot number; or includes a timeslot number and information about a location of an uplink TPC command in a timeslot corresponding to the timeslot number; or includes offset of a timeslot number and information about a location of an uplink TPC command in a timeslot corresponding to the offset of the timeslot number.

Figure 10:
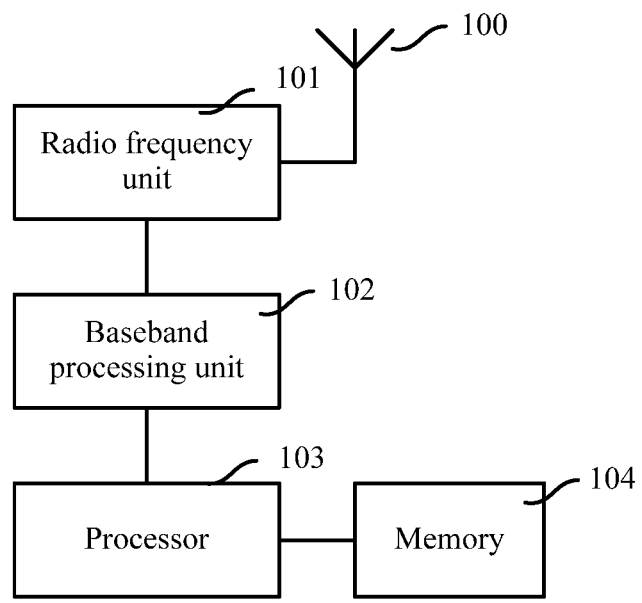
FIG. 10 is a schematic structural diagram of a base station according to another embodiment of the present invention.

Referring to FIG. 10, FIG. 10 is a schematic structural diagram of a base station according to another embodiment of the present invention. This schematic diagram shows a hardware structure of the base station, where a radio frequency unit 101 performs communication with a terminal by using an antenna 100; a baseband processing unit 102 is configured to perform baseband processing; a memory 104 stores one or more executable programs, which are used to configure a processor 103; the processor 103 is configured with one or more executable programs, where the one or more executable programs are used to execute the process shown in FIG. 6.

Specifically, the processor 103 receives, by using the antenna 100 and the radio frequency unit 101, indication information sent by a radio network controller, where the indication information is used to indicate a sending timeslot of an uplink transmission power control TPC command of a terminal; the processor 103 sends an uplink TPC command to the terminal according to the indication information.

Preferably, the indication information includes sending timeslots that are of multiple uplink TPC commands and that are allocated to the terminal, where the sending timeslots of the multiple uplink TPC commands are in one-to-one correspondence with cells that are under the base station and that serve the terminal, and the term "multiple" refers to two or more.

Preferably, in sending timeslots that are of uplink TPC commands and that are indicated for N terminals, sending timeslots of uplink TPC commands of at least two terminals are different from each other, where N is an integer greater than 1. Preferably, the sending timeslots of the uplink TPC commands of the N terminals are different from each other.

Preferably, if sending timeslots of uplink TPC commands of K terminals in the N terminals are the same, locations of the uplink TPC commands of the K terminals in a timeslot are different from each other, where K is an integer less than or equal to N.

Preferably, the indication information includes a timeslot number or offset of the timeslot number; the processor 103 may determine a corresponding timeslot according to a timeslot number corresponding to the terminal or offset of the timeslot number corresponding to the terminal, and send, in a determined timeslot, an uplink TPC command to the terminal.

Preferably, the indication information includes a timeslot number and information about a location of an uplink TPC command in a timeslot corresponding to the timeslot number; the processor 103 may send, at a corresponding location in a corresponding timeslot, an uplink TPC command to the terminal according to a timeslot number corresponding to the terminal and the information about the location of the uplink TPC command in the timeslot corresponding to the timeslot number; or preferably, the indication information includes offset of a timeslot number and information about a location of an uplink TPC command in a timeslot corresponding to the offset of the timeslot number; the processor 103 may send, at a corresponding location in a corresponding timeslot, an uplink TPC command to the terminal according to offset of a timeslot number corresponding to the terminal and the information about the location of the uplink TPC command in the timeslot corresponding to timeslot corresponding to the offset of the timeslot number.

Figure 11:
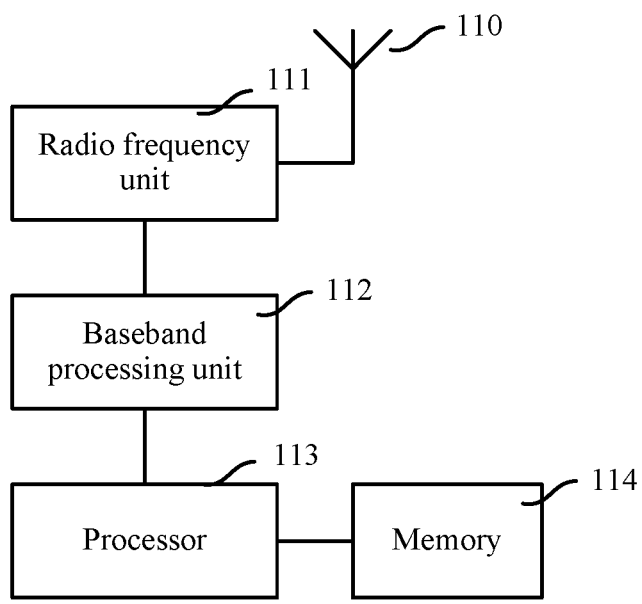
FIG. 11 is a schematic structural diagram of a terminal according to another embodiment of the present invention.

Referring to FIG. 11, FIG. 11 is a schematic structural diagram of a base station according to another embodiment of the present invention. This schematic diagram shows a hardware structure of the base station, where a radio frequency unit 111 performs communication with a base station by using an antenna 110; a baseband processing unit 112 is configured to perform baseband processing; a memory 114 stores one or more executable programs, which are used to configure a processor 113; the processor 113 is configured with one or more executable programs, where the one or more executable programs are used to execute the process shown in FIG. 7.

Specifically, the processor 113 receives, by using the antenna 110 and the radio frequency unit 111, indication information sent by a radio network controller, where the indication information is used to indicate a sending timeslot of an uplink TPC command of a terminal; the processor 113 receives an uplink TPC command according to the indication information.

Preferably, the indication information includes sending timeslots of multiple uplink TPC commands of the terminal, where the sending timeslots of the multiple uplink TPC commands are in one-to-one correspondence with cells of a corresponding quantity that are under the base station and that serve a same terminal, where the term "multiple" refers two or more; or, the processor 113 receives, by using the antenna 110 and the radio frequency unit 111, multiple indication information that is used to indicate a sending timeslot of an uplink TPC command and that is sent by the network controller, where the sending timeslots that are of the multiple uplink TPC commands and that are indicated by the multiple indication information are in one-to-one correspondence with cells of a corresponding quantity that are under the base station and that serve the same terminal, and the term "multiple" refers to two or more.

Preferably, in sending timeslots that are of uplink TPC commands and that are indicated by the radio network controller for N terminals, sending timeslots of uplink TPC commands of at least two terminals are different from each other, where N is an integer greater than 1. Preferably, the sending timeslots of the uplink TPC commands of the N terminals are different from each other.

For another example, if sending timeslots of the uplink TPC command of the terminal and an uplink TPC command of at least one another terminal in the N terminals are the same, a location of the uplink TPC command of the terminal and a location of an uplink TPC command of at least one another terminal that are in a timeslot are different from each other.

Preferably, the indication information includes a timeslot number or offset of the timeslot number; the processor 113 may determine a corresponding timeslot according to the timeslot number or the offset of the timeslot number, and receives, in a determined timeslot, an uplink TPC command.

Preferably, the indication information includes a timeslot number and information about a location of an uplink TPC command in a timeslot corresponding to the timeslot number, and the processor 113 may receive, in the timeslot corresponding to the timeslot number and at a location indicated by the location information, an uplink TPC command by using the antenna 110 and the radio frequency unit 111; or, the indication information includes offset of a timeslot number and information about a location of an uplink TPC command in a timeslot corresponding to the offset of the timeslot number, and the processor 113 may receive, in the timeslot corresponding to the offset of the timeslot number and at a location indicated by the location information, an uplink TPC command by using the antenna 110 and the radio frequency unit 111.

The foregoing embodiments of the present invention may apply to different algorithms of uplink inner loop power control.

For example, in an uplink power control algorithm, a base station sends, in each timeslot, an uplink TPC command, and a terminal adjusts, in each timeslot, uplink DPCCH transmission power according to a received uplink TPC command. The base station sends an uplink TPC command according to a sending timeslot that is of an uplink TPC command and that is indicated by an RNC; the terminal receives the uplink TPC command according to the sending timeslot that is of the uplink TPC command and that is indicated by the RNC; the RNC indicates the sending timeslot of the uplink TPC command to the terminal and the base station by using the methods provided in the embodiments of the present invention.

For another example, in another uplink power control algorithm, a base station sends, in each timeslot, an uplink TPC command, and a terminal adjusts, in every five timeslots, uplink DPCCH transmit power according to a received uplink TPC command, that is, a user terminal makes, in each timeslot, a hard decision on uplink TPC. If results of five uplink TPC hard decisions are the same, adjustment on the uplink DPCCH transmit power takes effect according to what is indicated by an uplink TPC command word, or if results of the five uplink TPC hard decisions are different, the uplink DPCCH transmit power remains unchanged. The base station sends an uplink TPC command according to a sending timeslot that is of an uplink TPC command and that is indicated by an RNC; the terminal receives the uplink TPC command according to the sending timeslot that is of the uplink TPC command and that is indicated by the RNC; the RNC indicates a sending timeslot of the uplink TPC command to the terminal and the base station by using the methods provided in the embodiments of the present invention.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A base station, comprising:
a processor; and
a non-transitory computer readable storage medium storing a program for execution by the processor, the program including instructions to enable the base station to perform operations including:
receiving indication information sent by a radio network controller, wherein the indication information is used to indicate a sending timeslot of an uplink transmission power control (TPC) command of a terminal; and
sending an uplink TPC command to the terminal according to the indication information;
wherein: the indication information comprises a timeslot number or an offset of the timeslot number; and
the sending an uplink TPC command to the terminal according to the indication information comprises:
determining a corresponding timeslot according to a timeslot number corresponding to the terminal or an offset of the timeslot number, and sending, in a determined timeslot, an uplink TPC command to the terminal.

2. The base station according to claim 1, wherein in sending timeslots that are of uplink TPC commands and that are indicated for N terminals, sending timeslots of uplink TPC commands of at least two terminals are different from each other, wherein N is an integer greater than 1.

3. The base station according to claim 2, wherein the sending timeslots of the uplink TPC commands of the N terminals are different from each other.

4. The base station according to claim 2, wherein if sending timeslots of uplink TPC commands of K terminals in the N terminals are the same, locations of the uplink TPC commands of the K terminals in a timeslot are different from each other, wherein K is an integer less than or equal to N.

5. A terminal, comprising:
a processor; and
a non-transitory computer readable storage medium storing a program for execution by the processor, the program including instructions to enable the terminal to perform operations including:
receiving indication information sent from a radio network controller, wherein the indication information is used to indicate a sending timeslot of an uplink TPC command of the terminal; and
receiving an uplink TPC command according to the indication information;
wherein: the indication information comprises a timeslot number or an offset of the timeslot number; and receiving an uplink TPC command according to the indication information comprises:
determining a corresponding timeslot according to the timeslot number or the offset of the timeslot number, and receiving, in a determined timeslot, an uplink TPC command.

6. The terminal according to claim 5, wherein in sending timeslots that are of uplink TPC commands and that are indicated by the radio network controller for N terminals, sending timeslots of uplink TPC commands of at least two terminals are different from each other, wherein N is an integer greater than 1.

7. The terminal according to claim 6, wherein the sending timeslots of the uplink TPC commands of the N terminals are different from each other.

8. The terminal according to claim 6, wherein if sending timeslots of the uplink TPC command of the terminal and an uplink TPC command of at least one another terminal in the N terminals are the same, a location of the uplink TPC command of the terminal and a location of the uplink TPC command of the at least one another terminal that are in a timeslot are different from each other.

9. A TPC command transmission method, comprising:
receiving, by a base station, indication information sent by a radio network controller, wherein the indication information is used to indicate a sending timeslot of an uplink TPC command of a terminal; and
sending, by the base station, an uplink TPC command to the terminal according to the indication information;
wherein: the indication information comprises a timeslot number or an offset of the timeslot number; and
the sending, by the base station, an uplink TPC command to the terminal according to the indication information comprises:
determining, by the base station, a corresponding timeslot according to a timeslot number corresponding to the terminal or an offset of the timeslot number; and sending, in a determined timeslot, an uplink TPC command to the terminal.

10. The method according to claim 9, wherein in sending timeslots that are of uplink TPC commands and that are indicated for N terminals, sending timeslots of uplink TPC commands of at least two terminals are different from each other, wherein N is an integer greater than 1.

11. The method according to claim 10, wherein the sending timeslots of the uplink TPC commands of the N terminals are different from each other.

12. The method according to claim 10, wherein if sending timeslots of uplink TPC commands of K terminals in the N terminals are the same, locations of the uplink TPC commands of the K terminals in a timeslot are different from each other, wherein K is an integer less than or equal to N.

13. A TPC command transmission method, comprising:
receiving, by a terminal, indication information sent from a radio network controller, wherein the indication information is used to indicate a sending timeslot of an uplink TPC command of the terminal; and
receiving, by the terminal, an uplink TPC command according to the indication information;
wherein: the indication information comprises a timeslot number or an offset of the timeslot number; and
the receiving, by the terminal, an uplink TPC command according to the indication information comprises:
determining, by the terminal, a corresponding timeslot according to the timeslot number or the offset of the timeslot number, and receiving, in a determined timeslot, an uplink TPC command.

14. The method according to claim 13, wherein in sending timeslots that are of uplink TPC commands and that are indicated by the radio network controller for N terminals, sending timeslots of uplink TPC commands of at least two terminals are different from each other, wherein N is an integer greater than 1.

15. The method according to claim 14, wherein the sending timeslots of the uplink TPC commands of the N terminals are different from each other.

16. The method according to claim 14, wherein if sending timeslots of the uplink TPC command of the terminal and an uplink TPC command of at least one another terminal in the N terminals are the same, a location of the uplink TPC command of the terminal and a location of the uplink TPC command of the at least one another terminal that are in a timeslot are different from each other.

* * * * *